(12) United States Patent
Krivopaltsev

(10) Patent No.: US 8,139,509 B2
(45) Date of Patent: Mar. 20, 2012

(54) INSTALLATION AND MANAGEMENT OF MOBILE DEVICE [{S}] CONFIGURATION

(75) Inventor: Eugene Krivopaltsev, San Jose, CA (US)

(73) Assignee: Innopath Software, Inc., Sunnyvale, CA (US)

( * ) Notice: Subject to any disclaimer, the term of this patent is extended or adjusted under 35 U.S.C. 154(b) by 298 days.

(21) Appl. No.: 12/189,017

(22) Filed: Aug. 8, 2008

(65) Prior Publication Data

US 2009/0040947 A1    Feb. 12, 2009

Related U.S. Application Data

(60) Provisional application No. 60/964,180, filed on Aug. 8, 2007, provisional application No. 60/964,131, filed on Aug. 8, 2007.

(51) Int. Cl.
*H04L 12/28* (2006.01)

(52) U.S. Cl. ............................................. 370/255

(58) Field of Classification Search ................ None
See application file for complete search history.

(56) References Cited

U.S. PATENT DOCUMENTS

| | | | |
|---|---|---|---|
| 2005/0010585 A1* | 1/2005 | Sahinoja et al. | 707/100 |
| 2006/0069743 A1* | 3/2006 | Oommen | 709/217 |
| 2007/0165654 A1* | 7/2007 | Chai et al. | 370/401 |
| 2007/0250933 A1* | 10/2007 | Rantanen | 726/26 |
| 2008/0288630 A1* | 11/2008 | Merat et al. | 709/224 |

* cited by examiner

*Primary Examiner* — Ayaz Sheikh
*Assistant Examiner* — Blanche Wong
(74) *Attorney, Agent, or Firm* — Gregory & Sawrie LLP

(57) ABSTRACT

Embodiments of a method and system for managing configurations on mobile devices are described. A method under an embodiment utilizes one or more advanced commands defined by the OMA DM protocol. One such command is the "Get" command, which can be used recursively to traverse a management tree to access the necessary nodes. A variation of this command is the "Get[Struct Data]" command, which traverses a tree or subtree in a single execution instance. The "Get" command is used to get a snapshot from a management tree starting from a specified URI. For this embodiment, it is presumed that a "golden" copy of device exists. The golden copy can be initially configured either manually or by using a mobile device management platform. The method uses a golden device to make a configuration snapshot to be used later for a distribution to multiple targets.

22 Claims, 4 Drawing Sheets

INSTALLATION AND MANAGEMENT OF MOBILE DEVICE [{S}] CONFIGURATION

CROSS-REFERENCE TO RELATED APPLICATIONS

This application claims priority from U.S. Provisional Patent Application No. 60/964,131, entitled "Managing and Enforcing Policies on Mobile Devices," filed Aug. 08, 2007, which is incorporated by reference in its entirety herein; and from U.S. Provisional Patent Application No. 60/964,180, entitled "Integrated Mobile Device Management," filed Aug. 08, 2007, which is incorporated by reference in its entirety herein.

TECHNICAL FIELD

Embodiments are described relating to telecommunication devices, and more specifically to managing configuration parameters on mobile devices.

BACKGROUND

Mobile and remotely managed devices such as cellular phones, television set-top boxes, home internet gateways and so forth are becoming increasingly prevalent and increasingly complex. Much of the increased complexity lies in the number and types of application programs that are available on these devices. These applications are produced by many different vendors and utilize different resources on the mobile device. With each application, there are usually large numbers of parameters that must be properly set. The increased complexity of mobile devices has thus led to challenges in properly configuring the devices for optimum use. Consequently, as mobile device technology advances, there is a constant drive to provide consistent application configuration management.

At present, configuration management for mobile devices typically entails a high degree of user interaction with the applications and device, and a potentially high level of interaction with service providers, application vendors, or other third party content providers. This is often a time consuming and frustrating process for many mobile device users.

Present configuration management systems typically include a server component, which sends out the management commands to the mobile devices, and a client command, which runs on the handset and receives and implements the management commands. In some cases, a single vendor may provide both the client and the server, in others client and server will come from different sources. Early configuration management methods required connection of the handset to a service or installation of a SIM (subscriber identity module) card in order to make changes and updates. Such a method requires a high degree of user involvement and is not conducive to propagating changes across a high number of devices.

Central remote management, using commands sent over the air, have been developed for configuration management systems. In this system, a system administrator can use an administrative console to update or configure any one handset, group or groups of handsets. This method provides scalability benefits that are useful when the fleet of managed devices is large in size. However, such methods often require custom installation of modified code that may require different configuration steps, thus possibly increasing the complexity of upgrade operations.

Efforts have been made to introduce mobile devices that are standard compliant. These efforts have sought to introduce some uniformity with respect to device protocols and application implementation. One standard management protocol that has been developed for management of mobile devices is the OMA DM (Open Mobile Alliance Device Management) protocol. OMA DM is generally used by a server computer to retrieve, analyze and set management properties values for the mobile client. The OMA DM specification is designed for management of small mobile devices such as cell phones, PDAs and palm top computers. The device management function is intended to support the following typical uses: provisioning including configuration of the device, enabling and disabling of features; software upgrades, fault management, and the like. Use of the OMA DM specification facilitates use with small foot-print devices, where memory and storage space may be limited, bandwidth constrained devices, and limited security devices.

Under the OMA DM specification, mobile devices are treated as managed objects that are exposed within the so-called OMA DM Management tree. Present techniques for configuring such managed objects are based on a set of OMA DM commands that set configuration parameters using device management tree properties. This method of configuration requires detailed knowledge of all management properties unified resource identifiers (URIs) defined within a device description file (DDF) and desirable property values.

What is needed, therefore, is a mobile device configuration system that leverages the ability of the OMA DM specification, but that does not require detailed knowledge of the URIs for the management properties.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a method and system for managing configurations on mobile devices are described. A method under an embodiment utilizes one or more advanced commands defined by the OMA DM protocol. One such command is the "Get" command, which can be used recursively to traverse a management tree to access the necessary nodes. A variation of this command is the "Get[Struct Data]" command, which traverses a tree or subtree in a single execution instance. The "Get" command is used to generate a snapshot from a management tree starting from a specified URI. For this embodiment, it is presumed that a "golden" copy of device exists. The golden copy can be initially configured either manually or by using a mobile device management platform. The method uses a golden device to make a configuration snapshot to be used later for a distribution to multiple targets.

This method hides a complexity related to a detailed knowledge of a management tree and individual nodes values. In order to create a "push and clone" configuration a mobile device administrator selects a device and a root of a managed object to be cloned. The method facilitates a creation of multiple "push and clone" configurations each optimally suited for certain business/environmental conditions. A mobile device management platform utilizes the created configurations by distributing them to multiple similar mobile devices. This platform can be used as a foundation for a system or enterprise-wide backup and restore functionality. Embodiments include functionality that presents a configuration snapshot to a system administrator who can selectively disable the storing of personalized properties and therefore preserve them from being overwritten during distribution.

In the following description, various examples are given for illustration, but none are intended to be limiting. The embodiments described herein provide a method and apparatus for managing a set of machine interpretable policy directions and enabling the enforcement of such policies on a mobile, or similarly remotely managed, device. The embodiments described herein include a system for managing configurations of mobile devices.

Figure 1:
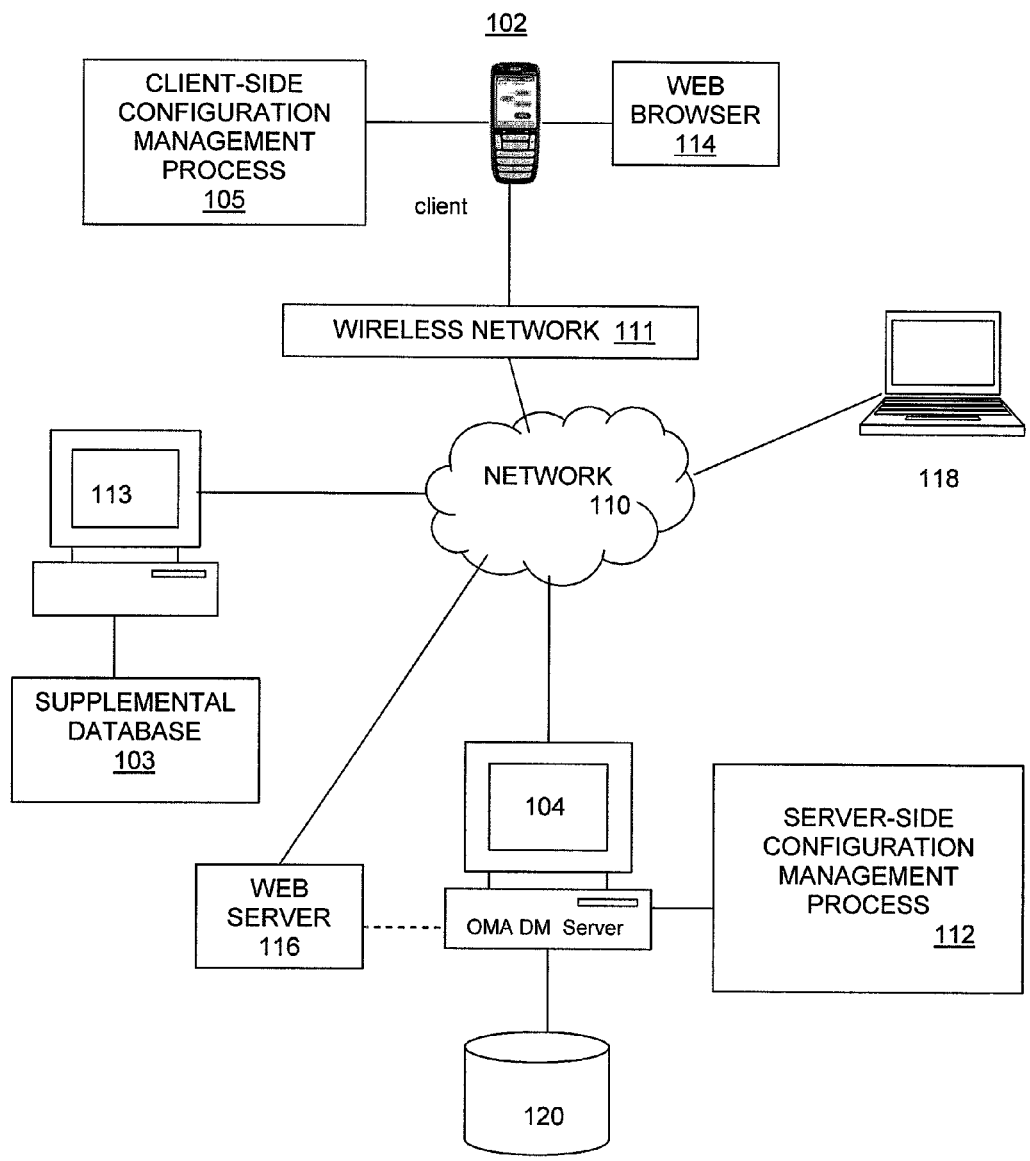
FIG. 1 illustrates a computer network system 100 that implements one or more embodiments of a mobile policy management system.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments of a mobile device configuration system. In system 100, a network server computer 104 is coupled, directly or indirectly, to one or more mobile client devices 102 and 118 through a network 110, and one or more possible other networks, such as wire or wireless (e.g., cellular) telephone network 111. The network interface between server computer 104 and client computer 102 may include one or more routers that serve to buffer and route the data transmitted between the server and client computers. Network 110 may be the Internet, a Wide Area Network (WAN), a Local Area Network (LAN), or any combination thereof.

In one embodiment, server 104 in network system 100 is an OMA DM (or MDM) server that executes a server-side mobile device configuration process 112. This process may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the server-side configuration management process 112 may be implemented in a plurality of different program modules, each of which may be executed by two or more distributed server computers coupled to each other, or to network 110 separately. In an embodiment in which network 110 comprises the Internet, a web server 116 comprises a gateway for server 104 communication with the client. The web server 116 can be a separate web server or, in some cases, it may be a process executed locally in server 104.

In one embodiment, the client device 102 executes a client-side policy configuration management process 105 to interact with the server-side policy management process 112 and to allow implementation of configuration changes autonomously on the mobile device. A separate content provider 103 may provide some of the data that is included in the configuration management process. Data for any of the configuration parameters, rules, and the like may also be provided by a data store 120 closely or loosely coupled to any of the server 104 and/or client 102.

The client device is typically a mobile client device that executes a number of different application programs that provide various functions or utilities, such as communication, entertainment, navigation, information management, and basic computing functions. Mobile client 102 may be a cell phone, smartphone, or any mobile communication device that provides access to the network 110 and has a sufficient degree of user input and processing capability to execute the client-side policy enforcement process 105. The client computer 102 may also be embodied in a standard mobile computing device 118 such as a notebook computer, personal digital assistant, game console, media playback unit, or similar computing device. The client computers 102 and 118 may be coupled to the server computer 104 over a wired connection, a wireless connection or any combination thereof. For example, if the mobile client 102 is a cell phone, access between the mobile device and network 110 will likely utilize a separate cell network 111 that is maintained by a telecommunications provider.

As shown in FIG. 1, the server computer 104 executes a server-side configuration management process 112. This process, along with the client-side process 105 comprises a mobile device configuration management framework that allows management authorities (e.g., carrier and IT administrator) to control the configuration of mobile devices according to optimum operational and deployment characteristics. This process represents part of a mobile device management (MDM) scheme that includes tools to distribute applications, data and configuration settings to the mobile device. Embodiments of the MDM system optimize the functionality and security of a mobile communications network by providing an efficient mechanism for configuration management, while minimizing cost and downtime.

In one embodiment, the server and client-side management processes 105 and 112 operate distribute, install, and execute mobile device configuration modules through FOTA (firmware over the air) updates. Such modules can include a number of different functions, such as diagnostics, remote configuration and provisioning, security, backup/restore, network usage and support, device provisioning, policy applications, logging and monitoring, and remote control and administration, and any other similar functions.

In one embodiment, the client-side process 105 of FIG. 1 includes an intelligent management agent residing in the mobile client device 102. The intelligent management agent relies on communication between the client-side mobile management process 105 residing on a mobile device and the server-side mobile device management (MDM) process 112 residing in server 104.

In one embodiment, a standard management protocol, such as OMA DM (Open Mobile Alliance Device Management), is used by the server to establish the configuration properties of the mobile client 102. In general, the OMA DM specification is designed for management of small mobile devices such as cell phones, PDAs and palm top computers. The device management function is intended to support the following typical uses: provisioning including configuration of the device, enabling and disabling features on the device; providing software upgrades, performing fault management, and the other similar functions. Use of the OMA DM specification facilitates use with small foot-print devices, where memory and storage space may be limited, bandwidth constrained devices, and limited security devices.

Figure 2:
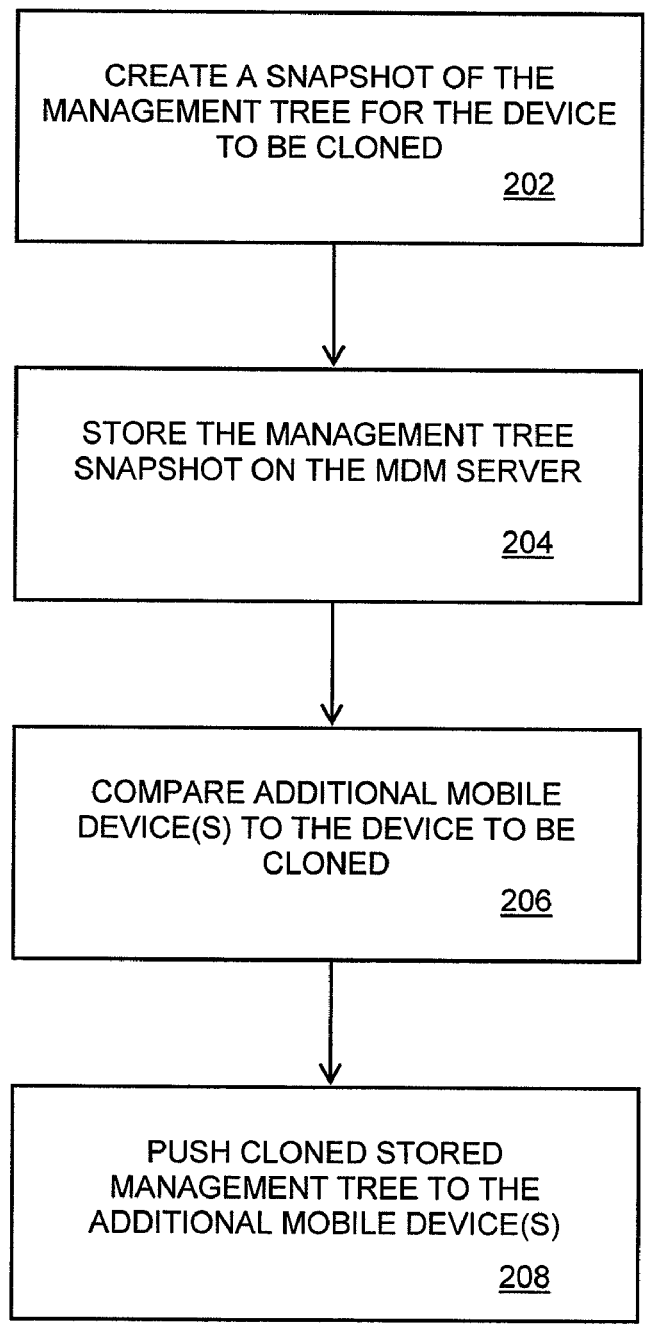
FIG. 2 is a flowchart that illustrates an overall method of cloning a device using the OMA DM specification, under an embodiment.

In one embodiment, the configuration management system implements a method of cloning a particular mobile device and distributing (pushing) the configuration of the cloned device to other similar devices using specific mechanisms provided by the OMA DM protocol. FIG. 2 is a flowchart that illustrates an overall method of cloning a device using the OMA DM specification, under an embodiment. The process creates a snapshot copy of at least part of the management tree of the mobile device to be cloned (source device), referred to as a "golden copy" of the device, block 202. This golden copy snapshot of the source device is then stored on the MDM server, block 204. Any further mobile device that is to be similarly configured is compared to the cloned device, block 206, and the management tree of the cloned device is then pushed to that device, block 208. Any number of target mobile devices can be compared and updated with the cloned device management tree, thus making this method easily applicable to large-scale upgrade operations involving many target devices. Furthermore, multiple configurations of a golden device or number of golden devices can be stored. Using appropriate database management techniques, these different configurations can all be stored and distributed to different target devices to create any number of configuration installations.

As shown in FIG. 2, the configuration of the golden device, including any relevant operating characteristics is represented and stored using the OMA DM device management tree structure. For OMA DM applications on a mobile device, configuration is handled by setting the values of objects in the OMA DM management tree for the device. Certain OMA DM applications may be predefined, such as bootstrap routines, diagnostics, and other applications. The OMA DM uses XML (extensible Markup Language) for data exchange. Device management of mobile clients takes place by communication between the MDM server 104 (which is managing the device) and the mobile client 102. OMA DM is designed to support and utilize any number of data transports such as, physically over both wireline (e.g., USB, RS-232) and wireless media (e.g., GSM, CDMA, IrDA or Bluetooth). The transport layers may be implemented over WAP (wireless application protocol), WSP (wireless session protocol), HTTP (hypertext transport protocol), OBEX (object exchange), or similar transport protocols. In one embodiment, the communication is initiated by the MDM server 104, is asynchronous using any applicable available method, such as a WAP Push or SMS (short message service). The initial message from server to client is said to be in the form of a notification, or alert message. Once the communication is established between the server 104 and client 102, a sequence of messages might be exchanged to complete a given device management task. The OMA DM protocol specifies exchange of packages during a session, each package consisting of several messages and each message in turn consisting of one or more commands. The server 112 initiates the commands and the mobile client 102 is expected to execute the commands and return the result via a reply message.

The mobile client 102 of FIG. 1, and every other device that supports OMA DM contains a management tree. The management tree contains and organizes all the available management objects so that the server 104 can access every node directly through a unique URI (uniform resource identifier).

The management tree comprises a number of hierarchically organized nodes, which are entities that are managed through the OMA DM protocol. An interior node can have an unlimited number of child nodes, while a leaf node must contain a value, including null. Each node has a set of run-time properties associated with it. All properties are only valid for the associated node. An access control list (ACL) dictates which server can manipulate that node. The manipulation includes adding a child node, getting the node's properties, replacing this node, or deleting this node, as well as other run-time properties.

Figure 3:
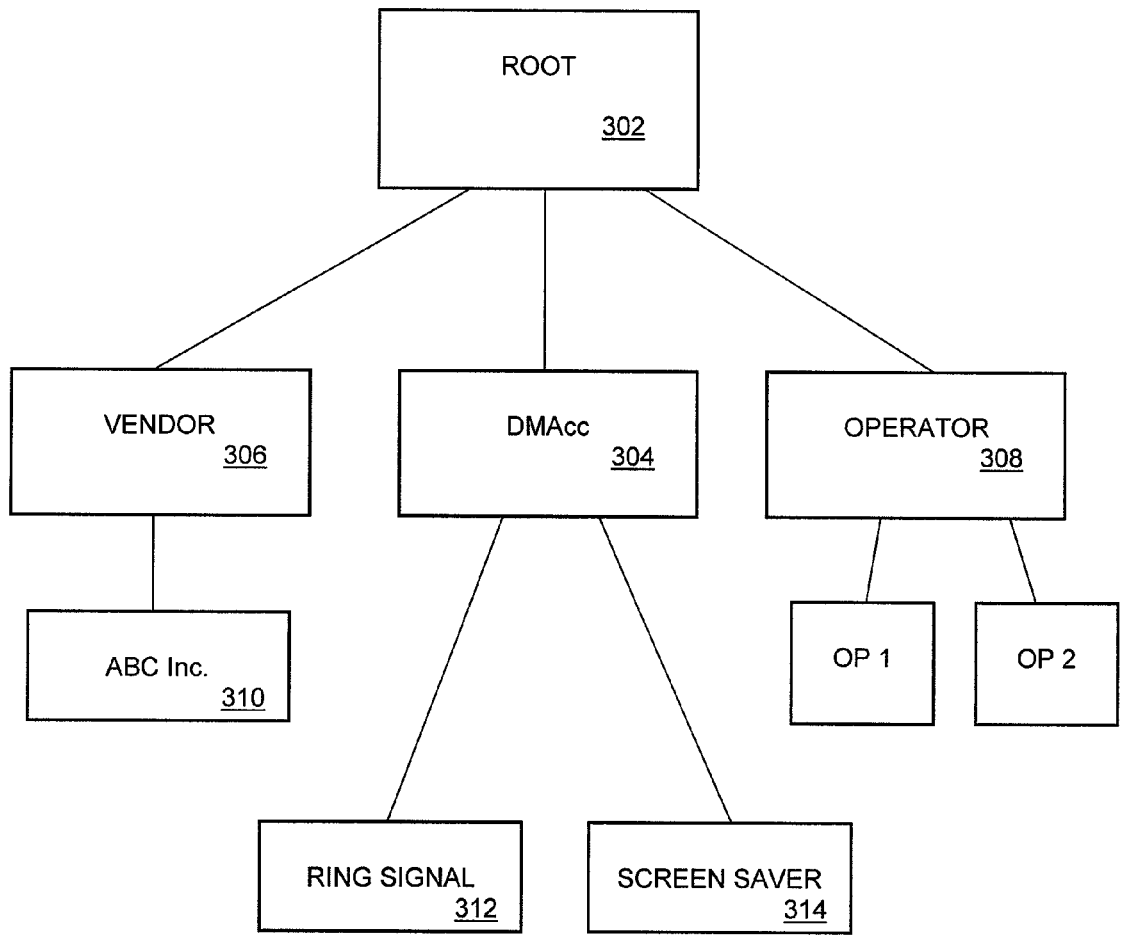
FIG. 3 illustrates an example OMA DM management tree, such as can be used in a push and clone method, under an embodiment.

FIG. 3 illustrates an example OMA DM management tree for a mobile client device, under an embodiment. As shown in FIG. 3, the management tree 300 includes a root node 302 and a number of subnodes under this root node. These subnodes can include a DMAcc node 304, a vendor node 306, and an operator node 308. Each node has an associated URI. For example, to access the "ABC Inc" node in the management tree of FIG. 3, the correct URI is "./DMAcc/ABCInc". The DMAcc node 304 generally specifies the settings for the device management client in a managed device. Any number of functions, applications or relevant settings for the client can be specified by subnodes in the management tree. For the example of FIG. 3, subnodes are shown for the ring signal 312 and screen saver 314 settings of the mobile client.

In general, communication between the elements of FIG. 1 using the OMA DM protocol is performed through a device management (DM) session consisting of a series of commands exchanged between the MDM server 104 and a client 102. The server sends commands indicating operations that must be performed on the client device's management tree. The client responds by sending commands, containing the results and any requested status information. An example of a short DM session would be as follows: the server sends a "Get" command to a client device to retrieve the contents of one of the nodes of the management tree; the client then performs the operation and responds with a "Result" command which contains the requested contents. A DM session can be divided into two phases consisting of a set-up phase and a management phase. In the setup phase, in response to a trigger event, the client device sends an initiating message to the server. The device and server then exchange needed authentication and device information. In the management phase, the server is in control and sends management commands to the client, which then responds. This phase ends when the DM server stops sending commands and terminates the session.

In one embodiment, the OMA DM "Get" command is used to traverse the mobile device management tree. In general, the "Get" command returns from a given URI only the direct child nodes for that URI. In this case, the server process recursively calls the "Get" command a required number of times to traverse the tree and return all of the required nodes from the mobile client.

In an alternative embodiment, the OMA DM v.1.2 command "Get[Struct Data]" is used to produce a snapshot of the management tree of a mobile device that is to be cloned (golden device). The "Get[Struct Data]" command completely traverses a tree structure starting from a specified URI, so unlike the simple "Get" command, no recursive process is required. The "Get[Struct Data]" command is a special variation of the OMA DM "Get" command. Both "Get[Struct Data]" and "Get" the require URI for a tree node. "Get[Struct Data]" completely traverses a tree structure starting from a specified URL.

Both commands are used to take a snapshot copy of the entire management tree, or of only a portion of the management tree starting from a specific URI (subnode). It is generally presumed that a good reference copy of the mobile device exists. The device can initially be configured manually or by using a mobile device management platform.

Examples of syntax for the "Get" and "Get[Struct Data]" commands are as follows:

1. Generic Get request from Server:

```
<Get>
<CmdID>5</CmdID>
<Item>
<Target>
<LocURI>./FUMO/State</LocURI>    URL for Get Command is bolded
<LocName>URL</LocName>
</Target>
</Item>
</Get>
```

2. Response to generic Get from Client:

```
<Status>
<CmdID>2</CmdID>
<MsgRef>2</MsgRef>
<CmdRef>5</CmdRef>
<Cmd>Get</Cmd>
<TargetRef>./FUMO/State</TargetRef>
<Data>200</Data>
</Status>
<Results>
<CmdID>3</CmdID>
<MsgRef>2</MsgRef>
<CmdRef>5</CmdRef>
<TargetRef>./FUMO/State</TargetRef>
<Item>
<Source>
<LocURI>./FUMO/State</LocURI>
</Source>
<Meta>
<Format xmlns='syncml:metinf'>int</Format>
<Type xmlns='syncml:metinf'>text/plain</Type>
</Meta>
<Data>90</Data>
</Item>
</Results>
```

3. Get[Struct Data] request from server:

```
<Get>
<CmdID>4</CmdID>
<Item>
<Target>
<LocURI><![CDATA[./DevDetail?list=StructData]]></LocURI>
URI contains query in form of list=StructData
</Target>
</Item>
</Get>
```

4. Response to Get[Struct Data] from Client:

```
<Status>
<CmdID>2</CmdID>
<MsgRef>2</MsgRef>
<CmdRef>4</CmdRef>
<Cmd>Get</Cmd>
<TargetRef>./DevDetail?list=StructData</TargetRef>
<Data>200</Data>
</Status>
```

As shown above, either the OMA DM "Get" or "Get[Struct Data]" command can be used in an embodiment of a method to make a golden copy of a client device.

Figure 4:
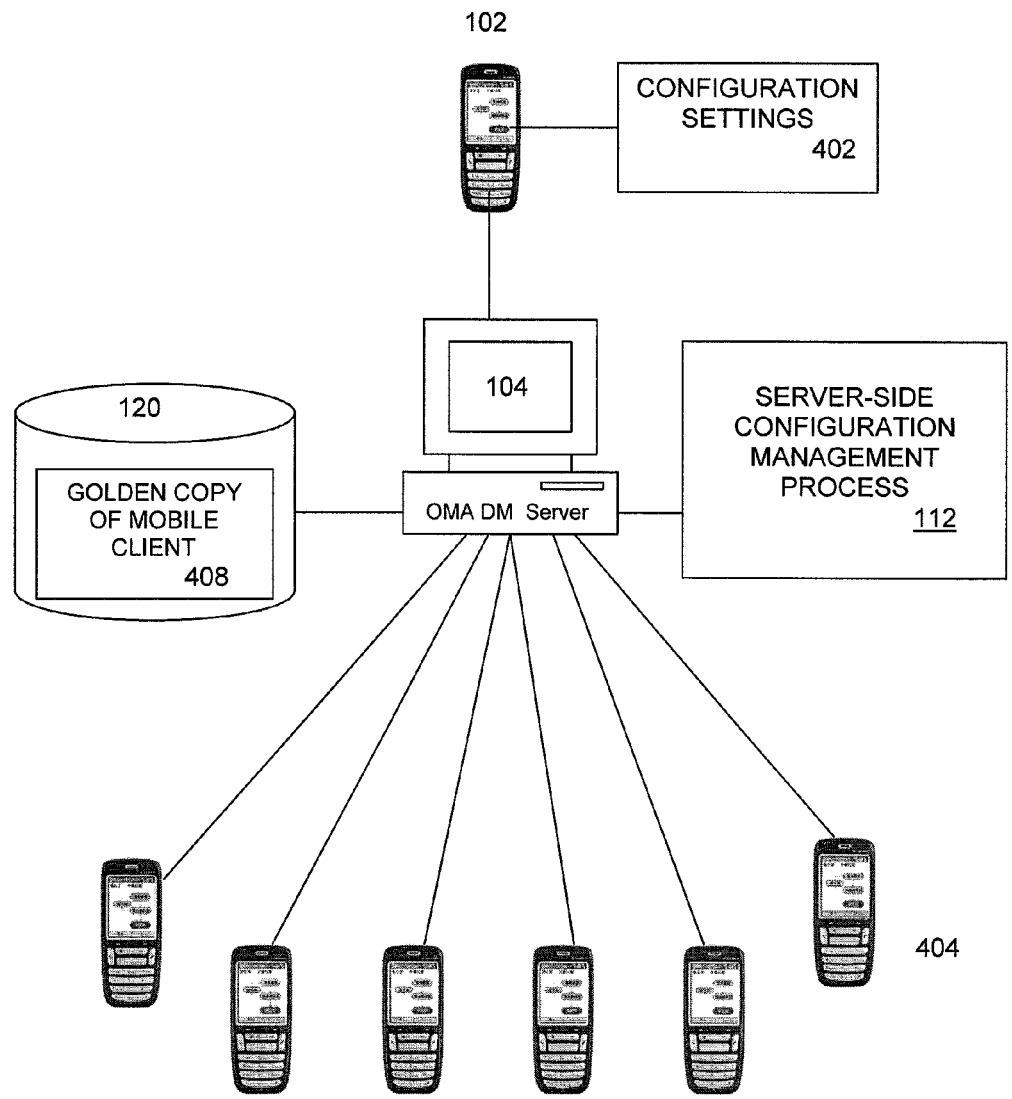
FIG. 4 is a block diagram of a system implementing a push operation to distribute the configuration of a golden copy of a mobile device to a number of target mobile clients, under an embodiment.

As shown in the flow process of FIG. 2, the copy of the management tree, or portion of the management tree for the source mobile device 102 is used to configure other mobile client devices. In one embodiment, a push operation is used by the MDM server, or any third party content server, to establish connections to other target mobile device and push the golden device management tree to these targets. FIG. 4 is a block diagram of a system that implements a push operation to distribute the golden copy of a configuration for an OMA DM compliant source device to a number of target mobile clients, under an embodiment. The configuration settings 402 of mobile device 102, which is the source device, are represented in a management tree. A snapshot golden copy of these configuration settings is then made using the OMA DM "Get" or "Get[Struct Data]" command, as described above. This copy 408 is stored in data store 120 of OMA DM server 104. The server-side configuration management process 112 then pushes this copy out to any number of target mobile devices 404. This methodology does not require detailed knowledge of the management tree or the individual node values.

In one embodiment, different configurations of the source device 102 can be captured through different golden copy snapshots. This facilitates the creation of multiple configurations, which can then be distributed to multiple target devices. In this manner, different configurations, each optimally suited for certain business or environmental conditions can be created and recreated on any number of different mobile devices.

In one embodiment, the push-based distribution method for the configuration scheme of the source mobile device essentially clones the source device 102 on any number of target devices 404. This method can implemented on a periodic basis to routinely update mobile devices deployed in the field or used by specific classes of users. A golden device can be configured to receive and test updates, such as software patches, version upgrades, and other modifications. These upgrades are then reflected in a particular configuration instance of the source device, and once validated, this can be distributed and implemented on any other target mobile device without necessitating that each target receive and validate the original changes. In a distributed software environment in which several client devices run the same programs, the disclosed method can form the basis of a backup and restore function that can robustly maintain uniform configuration parameters for a number of devices, disseminate updates, and provide failsafe recovery mechanisms in case of problems with individual target devices.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc.

The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

Components of the systems and methods described herein can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods described herein is not intended to be exhaustive or to limit the systems and methods described to the precise form disclosed. While specific embodiments of, and examples for, the systems and methods described herein are described herein for illustrative purposes, various equivalent modifications are possible within the scope of other systems and methods, as those skilled in the relevant art will recognize. The teachings of the systems and methods described herein provided herein can be applied to other processing systems and methods, not only for the systems and methods described above.

The elements and acts of the various embodiments described above can be combined to provide further embodiments. These and other changes can be made to the systems and methods described herein in light of the above detailed description.

What is claimed is:

1. A method of installing a configuration scheme of an Open Mobile Alliance Device Management (OMA DM) enabled mobile device onto one or more target devices, comprising:
creating a source copy of at least a portion of a management tree representing the mobile device in accordance with OMA DM specification, wherein the source copy is generated by discovering and fetching at least one of a structure and content of the at least a portion of a management tree;
storing the source copy in a data store accessible to an OMA DM compliant server, coupled to the mobile device over a network;
comparing the source copy with a configuration scheme of a target mobile device, wherein the configuration scheme comprises components of a target mobile device management tree; and
transmitting the source copy to the target mobile device in a push operation from the OMA DM compliant server if the source copy does not match the configuration scheme of the target mobile device.

2. The method of claim 1, wherein the discovering and fetching comprise using an OMA DM "Get" command that does not require knowledge of the at least one of a structure and content of the at least a portion of a management tree.

3. The method of claim 2 wherein the "Get" command is executed recursively to obtain a specified number of nodes hierarchically below a selected node of the at least a portion of a management tree.

4. The method of claim 2 wherein the "Get" command comprises a "Get[Struct Data]" command of the OMA DM specification that returns a specified number of nodes hierarchically below a selected node of the at least a portion of a management tree in a single command execution.

5. The method of claim 2 wherein the at least a portion of a management tree comprises a plurality of nodes, wherein at least one node of the plurality of nodes specifies configuration parameters for a function of the mobile device.

6. The method of claim 5 wherein the function comprises at least one of an application program, utility, or feature of the mobile device.

7. The method of claim 6 further comprising transmitting the source copy simultaneously to a number of additional target mobile devices.

8. The method of claim 7 further comprising:
scheduling a regular periodic update of the additional target mobile devices;
changing configuration of the mobile device in accordance with the regular periodic update;
storing the updated configuration in the data store by updating the source copy; and
transmitting the updated configuration to the additional target mobile devices according to the regular periodic update schedule.

9. A method comprising:
defining one or more configuration parameters of an application in an Open Mobile Alliance Device Management (OMA DM) enabled source mobile device;
representing the one or more configuration parameters in at least one node of an OMA DM management tree for the source mobile device; and
storing a portion of the management tree in a data store by discovering and fetching at least one of a structure and content of the management tree, wherein the data store is coupled to an OMA DM compliant server for later distribution to one or more target mobile devices.

10. The method of claim 9, wherein the discovering and fetching comprise transmitting the portion of the management tree containing the at least one node to the OMA DM compliant server in response to a "Get" type command from the OMA DM compliant server.

11. The method of claim 10 wherein the "Get" type command comprises a simple "Get" command of OMA DM specification, the method further comprising recursively calling the "Get" command to traverse the management tree across nodes derived from the at least one node.

12. The method of claim 10 wherein the "Get" type command comprises a "Get[Struct Data]" command of the OMA DM specification that traverses the management tree across nodes derived from the at least one node in a single execution.

13. The method of claim 10 wherein the source mobile device comprises a smartphone coupled to the OMA DM compliant server over at least one wireless network, and wherein the target mobile device comprises a similar smartphone device.

14. The method of claim 13 further comprising transmitting the source copy simultaneously to a number of additional target mobile devices.

15. A system for installing a configuration scheme of an Open Mobile Alliance Device Management (OMA DM) enabled mobile device onto one or more target devices, comprising:
   means for creating a source copy of at least a portion of a management tree representing the mobile device in accordance with OMA DM specification, wherein the source copy is generated by discovering and fetching at least one of a structure and content of the at least a portion of a management tree;
   means for storing the source copy in a data store accessible to an OMA DM compliant server, coupled to the mobile device over a network;
   means for comparing the source copy with a configuration scheme of a target mobile device, wherein the configuration scheme comprises components of a target mobile device management tree; and
   means for transmitting the source copy to the target mobile device in a push operation from the OMA DM compliant server if the source copy does not match the configuration scheme of the target mobile device.

16. The method of claim 15, wherein the discovering and fetching comprise using an OMA DM "Get" command that does not require knowledge of the at least one of a structure and content of the at least a portion of a management tree.

17. The system of claim 16 wherein the "Get" command is executed recursively to obtain a specified number of nodes hierarchically below a selected node of the at least a portion of a management tree.

18. The system of claim 16 wherein the "Get" command comprises a "Get[Struct Data]" command of the OMA DM specification that returns a specified number of nodes hierarchically below a selected node of the at least a portion of a management tree in a single command execution.

19. The system of claim 16 wherein the at least a portion of a management tree comprises a plurality of nodes, wherein at least one node of the plurality of nodes specifies configuration parameters for a function of the mobile device, and further wherein the function comprises at least one of an application program, utility, or feature of the mobile device.

20. The system of claim 19 wherein the mobile device comprises a smartphone coupled to the OMA DM compliant server over at least one wireless network, and wherein the target mobile device comprises a similar smartphone device.

21. The system of claim 20 further comprising means for transmitting the source copy simultaneously to a number of additional target mobile devices.

22. The system of claim 21 further comprising:
   means for scheduling a regular periodic update of the additional target mobile devices;
   means for changing configuration of the mobile device in accordance with the regular periodic update;
   means for storing the updated configuration in the data store; and
   means for transmitting the updated configuration to the additional target mobile devices according to the regular periodic update schedule.

* * * * *